(12) United States Patent
Valdes

(10) Patent No.: US 6,739,745 B1
(45) Date of Patent: May 25, 2004

(54) INTERNALLY ILLUMINATED HOLIDAY GARLAND

(76) Inventor: JoAnn M. Valdes, P.O. Box F, Gaston, NC (US) 27832

( * ) Notice: Subject to any disclaimer, the term of this patent is extended or adjusted under 35 U.S.C. 154(b) by 0 days.

(21) Appl. No.: 10/199,692

(22) Filed: Jul. 19, 2002

(51) Int. Cl.$^7$ ................................................ F21L 15/08
(52) U.S. Cl. ..................... 362/554; 362/565; 362/576; 362/802
(58) Field of Search ................................ 362/554, 565, 362/576, 252, 806

(56) References Cited

U.S. PATENT DOCUMENTS

| 4,542,446 | A | | 9/1985 | Shiff et al. |
| 4,937,107 | A | | 6/1990 | Mirisch, Sr. |
| 5,338,585 | A | | 8/1994 | Fraus et al. |
| 5,424,922 | A | * | 6/1995 | Wise ........................... 362/554 |
| 5,558,422 | A | | 9/1996 | Sanford |
| 5,609,412 | A | * | 3/1997 | Contigiani ................... 362/249 |
| 5,639,157 | A | * | 6/1997 | Yeh ............................. 362/567 |
| 5,639,521 | A | | 6/1997 | Fraus et al. |
| 5,915,827 | A | * | 6/1999 | Wang ........................... 362/252 |
| 5,975,717 | A | | 11/1999 | Rahman |
| 6,086,222 | A | | 7/2000 | Juba et al. |
| D453,384 | S | | 2/2002 | Chang |
| 6,352,355 | B1 | * | 3/2002 | Law ............................. 362/253 |

* cited by examiner

Primary Examiner—Thomas M. Sember
(74) Attorney, Agent, or Firm—Olen L. York, III

(57) ABSTRACT

Internally illuminated holiday garland are icicle lights used for holiday decorating on the exterior of a home. The internally illuminated holiday garland is similar to conventional icicle lights with the exception of a white garland covering that is provided over the center fiber optic strand. The internally illuminated holiday garland is applied to the building or home in the same manner as conventional icicle lights, and provides a unique look both at night and during the day as well. During the day, the white garland forms a unique trim item that mimics the general appearance of snow and helps to hide the wiring. At night, the garland provides a reflective material from which the light from the lamps will reflect to provide a shimmering effect. The use of the internally illuminated holiday garland allows for exterior holiday decorating in a manner, which is unique and eye catching both at night and during the day as well.

8 Claims, 3 Drawing Sheets

INTERNALLY ILLUMINATED HOLIDAY GARLAND

RELATED APPLICATIONS

The present invention was first described In Disclosure Document Registration 506,166 filed on Feb. 25, 2002 under 35 U.S.C. §122 and 37 C.F.R. §1.14. There are no previously filed, nor currently any applications, anywhere in the world.

BACKGROUND OF THE INVENTION

1. Field of the Invention

The present invention relates generally to holiday decorations and, more particularly, to internally illuminated holiday garland.

2. Description of the Related Art

The holiday season is a time of great fun and happiness for almost everyone. A great deal of the holiday cheer comes from the yearly traditions that are passed from generation to generation. One of these traditions that many people enjoy and take great pride in is the decorating of the exterior of one's home with festive lights. A recent addition to the various types of lights available is that of icicle lights. These lights hang from the roof line to mimic icicles. While they look beautiful at night, their daytime appearance is less than aesthetically pleasing. Additionally, their widespread use has diminished their uniqueness, leaving many people looking for the next outdoor lighting craze.

A search of the prior art did not disclose any patents that read directly on the claims of the instant invention; however, the following references were considered related:

U.S. Pat. No. 6,086,222 issued in the name of Juba et al, describes a cascade effect icicle light set;

U.S. Pat. No. 5,975,717 issued in the name of Rahman, describes a cascade effect icicle light set;

U.S. Pat. No. 5,639,521 issued in the name of Fraus et al., describes an ornamental Christmas display made with artificial garlands;

U.S. Pat. No. 5,558,442 Issued in the name of Sanford, describes a Fiber optic light string for providing illuminated holiday decorations;

U.S. Pat. No. 5,338,585 issued in the name of Fraus et al., describes an electric battery lights with garland segments;

U.S. Pat. No. 4,937,107 issued in the name of Mirisch, Sr., describes a decorative ornament having garland to a light string;

U.S. Pat. No. 4,542,446 issued in the name of Schiff et al., describes a decorative ornament having garland to a light string; and U.S. Pat. No. D453,384 issued in the name of Chang, describes a string lamp.

Consequently, there is a need for new product ideas and enhancements for existing products in the holiday decoration industry.

SUMMARY OF THE INVENTION

It is therefore an object of the present invention to provide an internally illuminated holiday garland.

It is another object of the present invention to provide an internally illuminated holiday garland that provides a header strand and a plurality of drop down garland strands of varying lengths.

It is yet still another object of the present invention to provide an internally illuminated holiday garland that provides a header strand and a plurality of drop down garland strands that are illuminated by a plurality of fiberoptic lights.

It is yet still another object of the present invention to provide an internally illuminated holiday garland that provides fiberoptic lights for creating a random array of light emanating from the garland strands.

Briefly described according to one embodiment of the present invention, the internally illuminated holiday garland are icicle lights used for holiday decorating on the exterior of a home. The invention is similar to conventional icicle lights with the exception of a white garland covering that is provided over the center fiber optic strand. The invention is applied to the building or home in the same manner as conventional icicle lights, and provides a unique look both at night and during the day as well. During the day, the white garland forms a unique trim item that mimics the general appearance of snow and helps to hide the wiring. At night, the garland provides a reflective material from which the light from the lamps will reflect to provide a shimmering effect. The use of internally illuminated holiday garland allows for exterior holiday decorating in a manner which is unique and eye catching both at night and during the day as well.

The use of the present invention provides users with all of the materials and tools necessary to ensure that a user may easily install, use and maintain the internally illuminated holiday garland.

An advantage of the present invention Is that it is specifically adapted for home use and installation because of the light weight components and the use of inexpensive materials.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
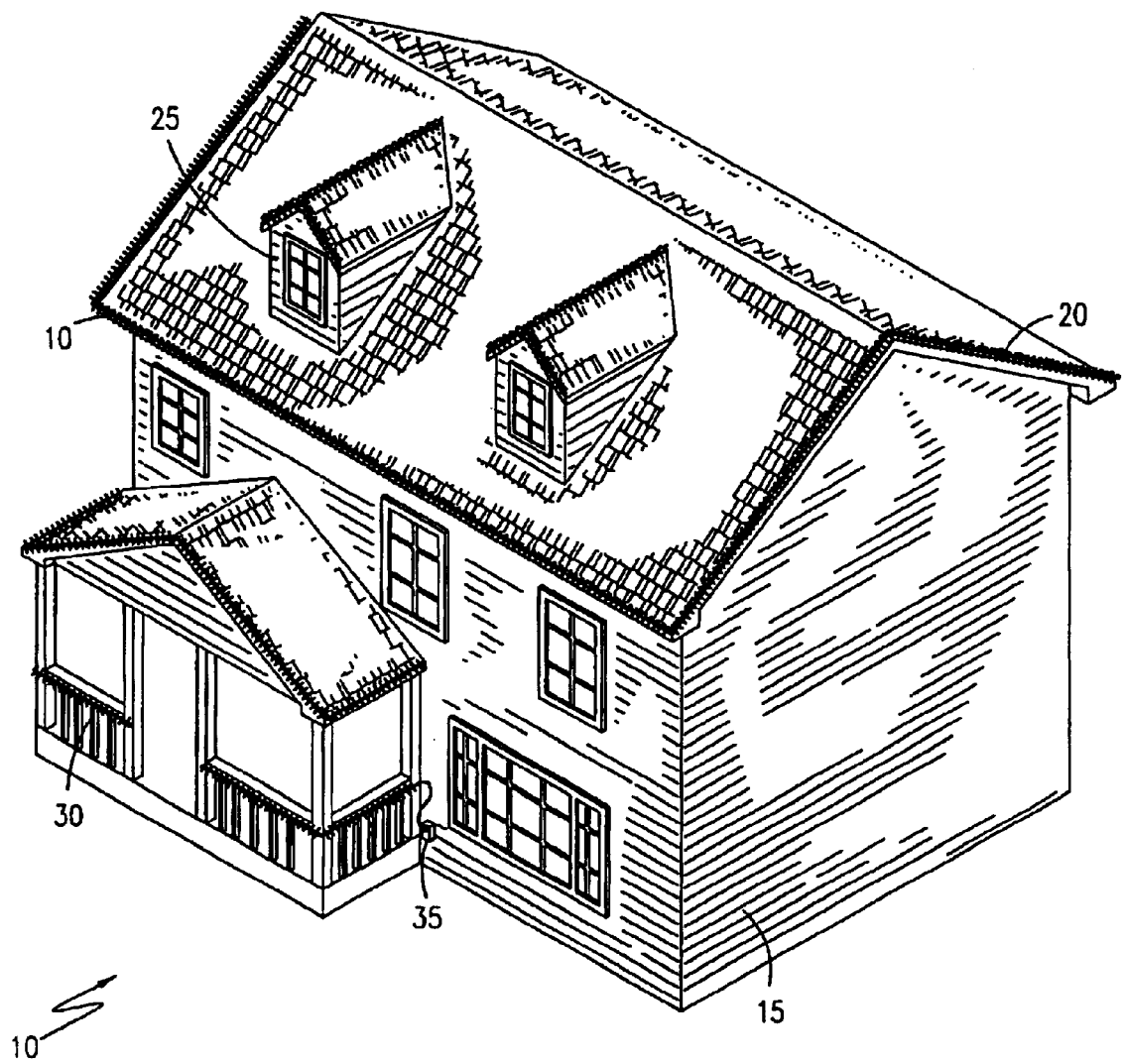
FIG. 1 is a pictorial representation of the internally illuminated holiday garland shown in use on a residential structure according to the preferred embodiment of the present invention.

LIST OF REFERENCE NUMBERS 10 internally illuminated holiday garland
15 residential structure
20 roof lines
25 dormers
30 railings
35 electrical receptacle
40 electrical plug
45 first conductor pair
50 illumination enclosure
55 garland header section
60 cord-mounted receptacle -continued

LIST OF REFERENCE NUMBERS 65 down drops
70 garland material core
75 fiber-optic strands
80 incandescent lamp
85 lamp socket
90 second conductor pair
95 third conductor pair
100 light tight box
101 light tight lid
102 light tight bottom
103 sidewall
104 sidewall
105 sidewall
106 sidewall
110 fastening means
115 first emerging light rays
120 axial ends of light fibers
125 fiber optic bundle
130 individual fiber optic strand
135 second emerging light rays
140 individual garland strands

DESCRIPTION OF THE PREFERRED EMBODIMENTS

The best mode for carrying out the invention is presented in terms of its preferred embodiment, herein depicted within the Figures.

1. Detailed Description of the Figures

Referring now to FIG. 1, multiple sections of internally illuminated holiday garland 10 are shown, according to the preferred embodiment of the present invention. The internally illuminated holiday garland 10 is attached to a residential structure 15, such as a house, along the roof lines 20, the dormers 25, the railings 30 and the like. Any surface of the residential structure 15 that provides a vertical edge for the Internally illuminated holiday garland 10 to drape over can be used. One end of the Internally illuminated holiday garland, 10 is connected to an electrical receptacle 35 as shown. Other methods of electrical connection, such as the use of extension cords, commonly used to connect and interconnect conventional holiday lighting displays can also be utilized. The electrical receptacle 35 provides standard residential voltage, such as 120 volts, and alternating current at 60 Hertz, as is commonly available in the United States.

Figure 2:
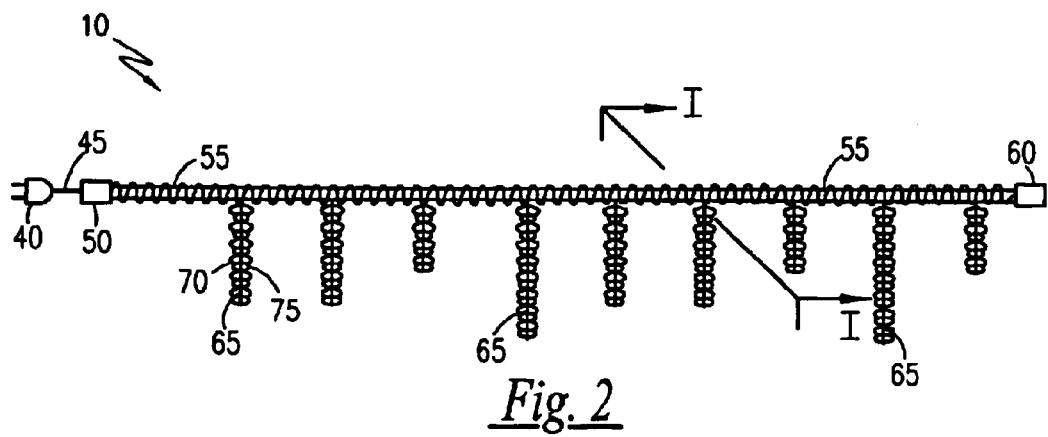
FIG. 2 is an elevational view of the internally illuminated holiday garland shown resting in a linear state.

Referring now to FIG. 2, an elevational view of the internally illuminated holiday garland 10 shown resting in a linear state is depicted. Electrical power is provided to the internally illuminated holiday garland 10 via an electrical plug 40, which carries power via a first conductor pair 45 to an illumination enclosure 50. The illumination enclosure 50 will be described in greater detail herein below. A garland header section 55 containing garland, fiber optic components and wiring, progresses along the entire length of the internally illuminated holiday garland 10 and terminates at the opposing end in a cord-mounted receptacle 60. The cord-mounted receptacle 60 allows for the plugging in of another section of internally illuminated holiday garland 10 (via a pair of female apertures for connecting to an electrical plug) to provide a total length as needed for the envisioned application. A multitude of down drops 65, spaced approximately eight to twelve inches apart, provide the appearance of icicles when viewed from a distance. Each down drops 65 is comprised of a garland material core 70, made from conventional materials, and a plurality of fiber-optic strands 75, whose cut ends are splayed in an outward fashion to produce an aesthetically pleasing array of random light points along the down drops 65. Said light is reflected by the garland material core 70 to produce reflections that are constantly moving dependent on one's observation point.

Figure 3:
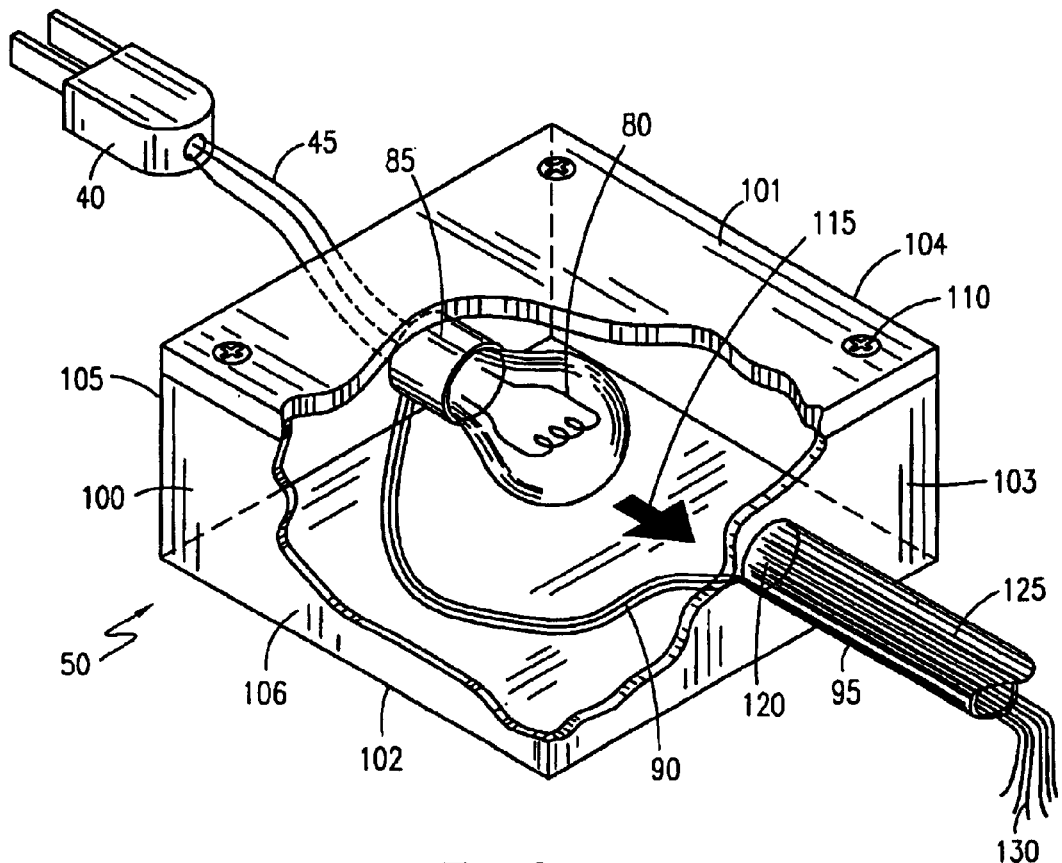
FIG. 3 is a cutaway isometric view of the light enclosure box as used with the internally illuminated holiday garland.

Referring next to FIG. 3, a cutaway isometric view of the illumination enclosure 50 as used with the internally illuminated holiday garland 10 is disclosed. An incandescent lamp 80 mounted in a lamp socket 85, receives power from the first conductor pair 45 and associated electrical plug 40. A second conductor pair 90 is connected to the lamp socket 85 in a parallel arrangement and provides power to a third conductor pair 95 which carries the same electrical potential along the garland header section 55 (as shown in FIG. 2) to the cord-mounted receptacle 60 (as shown in FIG. 2). The illumination enclosure 50 consists of a light tight box 100 formed by a light tight lid 101 and an opposing light tight bottom 102, with four sidewalls 103, 104, 105 and 106 perpendicularly depending from one another and also perpendicularly depending from the lid 101 and the bottom 102. The light tight lid 101 is secured to the light tight box 100 by use of a series of fastening means 110 such as a screw or clip. The access to the interior of the illumination enclosure 50 afforded by the light tight lid 101 allows for replacement of the incandescent lamp 80 due to failure or the desire of a different color incandescent lamp 80. First emerging light rays 115 from the incandescent lamp 80 strike a series of axial ends of light fibers 120, which causes the light to travel down a fiber optic bundle 125 in a conventional and well-known fashion. The fiber optic bundle 125 is composed of hundreds of individual fibers of which several are routed down each down drops 65 (as shown in FIG. 2) as an individual fiber optic strand 130. Additionally, a number of the individual fiber strands are released along the garland header section 55 (as shown in FIG. 2, but omitted here for clarity) to provide illumination along the garland header section 55 (as shown in FIG. 2). For example, if there are 300 individual fibers and 10 down drops, each down drop may contain 20 individual fibers and the remaining 100 individual fibers would be released along the length of the garland header section 55 (as shown in FIG. 2)

Figure 4:
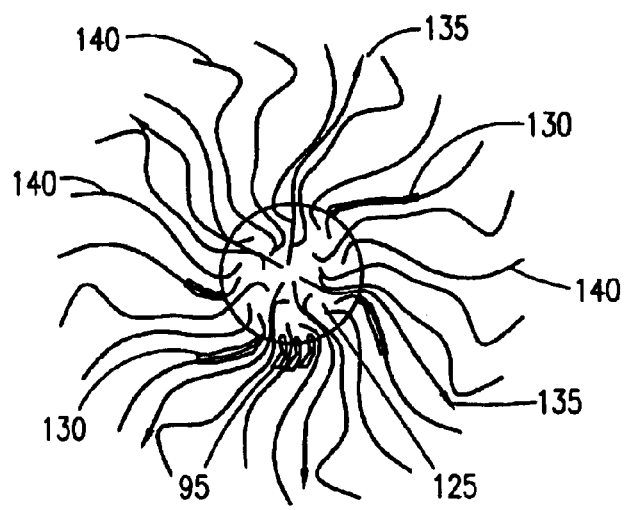
FIG. 4 is a cross sectional view of the internally illuminated holiday garland as seen along a line I—I in FIG. 2.

Referring now to FIG. 4, a cross sectional view of the internally illuminated holiday garland 10 as seen along a line I—I in FIG. 2 is shown. The fiber optic bundle 125 is visible in the center of the figure and becomes smaller in diameter the further away from the illumination enclosure 50 (as seen in FIG. 2). Also visible near center is the third conductor pair 95 which carries the electrical power the length of the garland header section 55 (as seen in FIG. 2). A series of individual fiber optic strands 130, arranged in a radial pattern around the fiber optic bundle 125 are visible and allow for the emitting of a series of second emerging light rays 135, also in a radial pattern. This pattern, produced along the entire length of the garland header section 55 (as seen in FIG. 2) produces an aesthetically pleasing random array of light points. Finally, individual garland strands 140, also arranged in a radial pattern in this view, are provided. The individual garland strands 140 are of a conventional design and material, such as reflective metal coated plastic or Mylar, and produce a multitude of reflective surfaces from which the second emerging light rays 135 may bounce and reflect, yet yielding an even more aesthetically pleasing effect. It should be noted that a section cut through a down drops 65 (as seen in FIG. 2) would be similar, except for the deletion of the third conductor pair 95.

Figure 5:
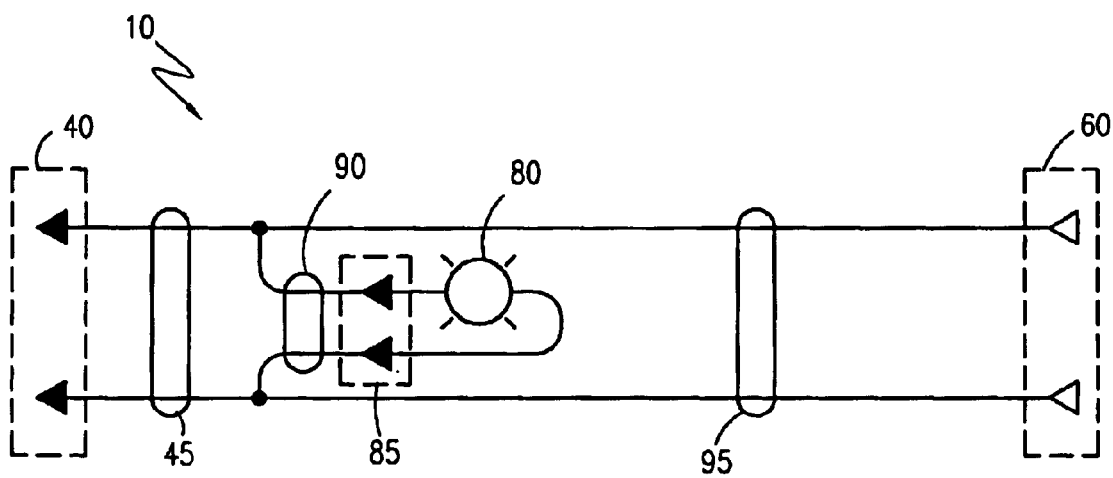
FIG. 5 is an electrical schematic of the internally illuminated holiday garland.

Referring finally to FIG. 5, an electrical schematic of the internally illuminated holiday garland 10 is disclosed. Electrical power originates at the electrical plug 40 and is carried by the first conductor pair 45 to the second conductor pair 90 and associated lamp socket 85 in a parallel arrangement. Also, connected in this arrangement is the third conductor pair 95 which carries the same potential voltages to the cord-mounted receptacle 60. The incandescent lamp 80 is inserted Into the lamp socket 85 by a common threaded design. It should be noted that this arrangement allows for the occurrence of an expired or "burned-out" incandescent lamp 80, while still providing power to downstream internally illuminated holiday garland 10 connected in a parallel fashion.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The present invention is designed with ease of operation features in mind that allow it to be utilized by a common user with little or no training or experience in a transparent manner. After acquisition of the internally illuminated holiday garland 10, it is placed along the roof lines 20, the dormers 25, the railings 30 and other surfaces of a residential structure 15 normally decorated with holiday lighting. The various discrete internally illuminated holiday garland 10 are interconnected electrically to provide a continuous effect along the desired lines. It should be noted that the incandescent lamp 80 may be changed to reflect different holiday seasons, such as red for valentines day, orange for Halloween and the like. Additionally, with multiple occurrences of the internally illuminated holiday garland 10, alternating strands can be different colors, yielding even further aesthetic variations such as red, white and blue for Independence day, red and green for Christmas, and the like. With such variations possible, it is envisioned that the internally illuminated holiday garland 10 may be left up year round.

The foregoing descriptions of specific embodiments of the present invention have been presented for purposes of illustration and description. They are not intended to be exhaustive or to limit the Invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. Holiday garland comprising:
   a linearly elongated garland header section having a first end portion and a second end portion;
   an illumination enclosure affixed to said first end portion, said illumination enclosure providing generation of light transmitted through said garland header section;
   a first conductor pair affixed to said illumination enclosure;
   an electrical plug affixed to said first conductor pair, said plug for transmitting electricity from an outlet to said first conductor pair;
   a cord-mounted receptacle affixed to said second end portion; and
   a plurality of down drops depending from said garland header section, wherein each one of said plurality of down drops comprises a fiber-optic bundle, said bundle comprising a plurality of fiber-optic strands with ends cut outwardly radiating for providing an aesthetically pleasing array of random lights points, and wherein each one of said plurality of down drops further comprises garland material core for providing reflections of generated light.

2. The holiday garland of claim 1, wherein said garland header section further comprises, fiber optic wiring and electrical wiring.

3. The holiday garland of claim 1, wherein said illumination enclosure comprises:
   a light tight box formed by a lid and an opposing bottom, and four sidewalls perpendicularly depending from one another, wherein said sidewalls are perpendicularly depending from said lid and bottom, wherein said lid, said bottom and said sidewalls are attached together by fastening means;
   an incandescent lamp mounted in a lamp socket, wherein said incandescent lamp and lamp socket receive electrical power from said first conductor pair and said electrical plug;
   a second conductor pair, wherein said second conductor pair is electrically coupled to said lamp socket; and
   a third conductor pair, wherein said third conductor pair is electrically coupled to said second conductor and provides electrical potential along said garland header section and to said cord-mounted receptacle.

4. The holiday garland of claim 1, wherein said cord-mounted receptacle comprises a pair of female apertures for receiving said electrical plug.

5. Holiday garland comprising:
   a plurality of linearly elongated garland header sections, wherein said garland header sections have a first end portion and a second end portion;
   an illumination enclosure affixed to said first end portion, said illumination enclosure providing generation of light transmitted through said garland header section;
   a first conductor pair affixed to said illumination enclosure;
   an electrical plug affixed to said first conductor pair, said plug for transmitting electricity from an outlet to said first conductor pair;
   a cord-mounted receptacle affixed to said second end portion, wherein said cord-mounted receptacle of a first holiday garland receives said electrical plug of a second holiday garland, thereby forming a multi-section garland header; and
   a plurality of down drops depending from said garland header section wherein each one of said plurality of down drops comprises a fiber-optic bundle, said bundle comprising a plurality of fiber-optic strands with ends cut outwardly radiating for providing an aesthetically pleasing array of random lights points, and wherein each one of said plurality of down drops further comprises garland material core for providing reflections of generated light.

6. The holiday garland of claim 5, wherein said garland header section further comprises fiber optic wiring and electrical wiring.

7. The holiday garland of claim 5, wherein said illumination enclosure comprises:
   a light tight box formed by a lid and an opposing bottom, and four sidewalls perpendicularly depending from one another, wherein said sidewalls are perpendicularly depending from said lid and bottom, wherein said lid, said bottom and said sidewalls are attached together by fastening means;

an incandescent lamp mounted in a lamp socket, wherein said incandescent lamp and lamp socket receive electrical power from said first conductor pair and said electrical plug;

a second conductor pair, wherein said second conductor pair is electrically coupled to said lamp socket; and a third conductor pair, wherein said third conductor pair is electrically coupled to said second conductor and provides electrical potential along said garland header section and to said cord-mounted receptacle.

8. The holiday garland of claim 5, wherein said cord-mounted receptacle comprises a pair of female apertures for receiving said electrical plug.

* * * * *